(No Model.)
J. M. VAN DERZEE.
Bale Tie.
No. 235,183.        Patented Dec. 7, 1880.
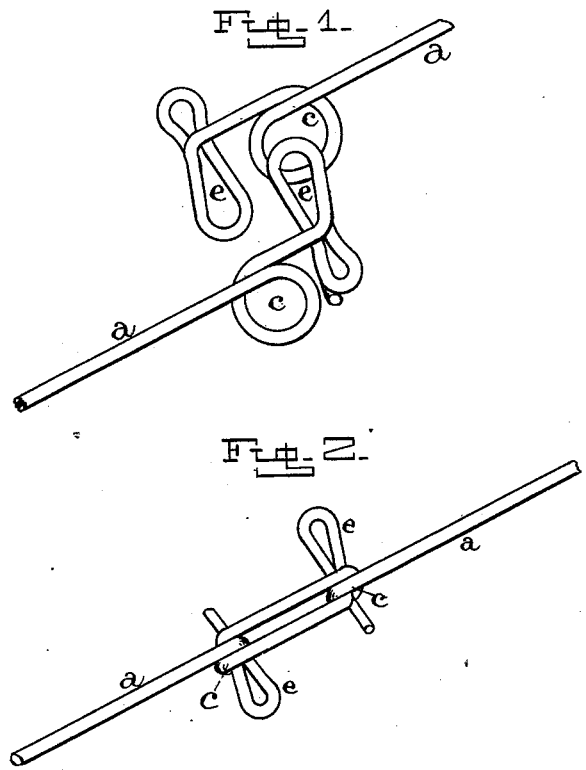
Witnesses:
J. W. Garner
Otto Stein
Inventor:
Jno. M. Van Derzee
per
F. A. Lehmann,
Atty.

UNITED STATES PATENT OFFICE.

JOHN M. VAN DERZEE, OF ALBANY, NEW YORK.

BALE-TIE.

SPECIFICATION forming part of Letters Patent No. 235,183, dated December 7, 1880.

Application filed November 10, 1880. (No model.)

*To all whom it may concern:*

Be it known that I, JOHN M. VAN DERZEE, of Albany, in the county of Albany and State of New York, have invented certain new and useful Improvements in Bale-Ties; and I do hereby declare the following to be a full, clear, and exact description of the invention, such as will enable others skilled in the art to which it pertains to make and use it, reference being had to the accompanying drawings, which form part of this specification.

My invention relates to an improvement in bale-ties; and it consists in one continuous wire which has a loop and a projection formed by bending the end back and forth upon itself two or more times made upon each end, which loops fit over the projections when the ends are fastened around the bale, and when the pressure of the bale comes upon the wire the loops automatically close around the projections so tightly that the ends cannot easily become separated, as will be more fully described hereinafter.

Figure 1 represents a perspective of the two ends of the tie, ready to be fastened together. Fig. 2 is a plan view of the ends fastened together.

*a* represents a wire of suitable length and thickness, and which has a loop, *c*, formed just back of the end, and the end itself is bent back and forth one or more times upon itself, so as to form a projection, *e*. These projections extend at right angles to the wire, and loops are made a little longer upon the end that is to pass through the loop than upon the end that is not brought into play, and each of the projections is contracted at its center, so as to be smaller than the ends.

The loops and projections are relatively so formed that when the two ends are brought together the projection on each end passes through the loop on the other. The loops being formed of a single thickness of wire, as soon as the bale begins to expand the wire is stretched to such an extent that the loops contract around the center of the projection, and thus lock the two ends rigidly together.

I am aware that it is not new to form a loop and projection on a bale-tie by bending the wire back upon itself and by twisting both ends; but in no case has the projection been contracted at its center and the loops made to close upon this constructed part without twisting either end.

Having thus described my invention, I claim—

A wire bale-tie having a loop, *c*, and a projection, *e*, upon each end, the two parts being relatively arranged so that the projections pass through the loops when the ends are brought together, substantially as shown.

In testimony that I claim the foregoing I have hereunto set my hand.

JOHN M. VAN DERZEE.

Witnesses:
SIMON MEYERS,
J. M. BAILEY.